United States Patent
Taylor, Jr.

[15] 3,706,989
[45] Dec. 19, 1972

[54] DIGITAL MOTION COMPENSATION SYSTEM FOR RADAR PLATFORMS

[72] Inventor: John W. Taylor, Jr., Baltimore, Md.

[73] Assignee: The United States of America as represented by the Secretary of the Air Force

[22] Filed: Oct. 28, 1970

[21] Appl. No.: 90,203

[52] U.S. Cl..................343/7 A, 343/7.5, 343/7.7
[51] Int. Cl..................................G01s 9/42
[58] Field of Search................343/7 A, 7.5, 7.7

[56] References Cited

UNITED STATES PATENTS 3,341,847   9/1967   Fried et al. ..................343/7.5

Primary Examiner—T. H. Tubbesing
Attorney—Harry A. Herbert, Jr. and George Fine

[57] ABSTRACT

A digital motion compensation system for radar platforms wherein motion of the radar platform is detected by a digital process using data which has already been digitized and stored for MTI (moving target indication) purposes.

3 Claims, 5 Drawing Figures

| TRUTH | TABLE | |
|---|---|---|
| Q | ΔI | OUTPUT |
| 0 | 0 | 0 |
| 0 | 1 | 1 |
| 1 | 0 | 1 |
| 1 | 1 | 0 |

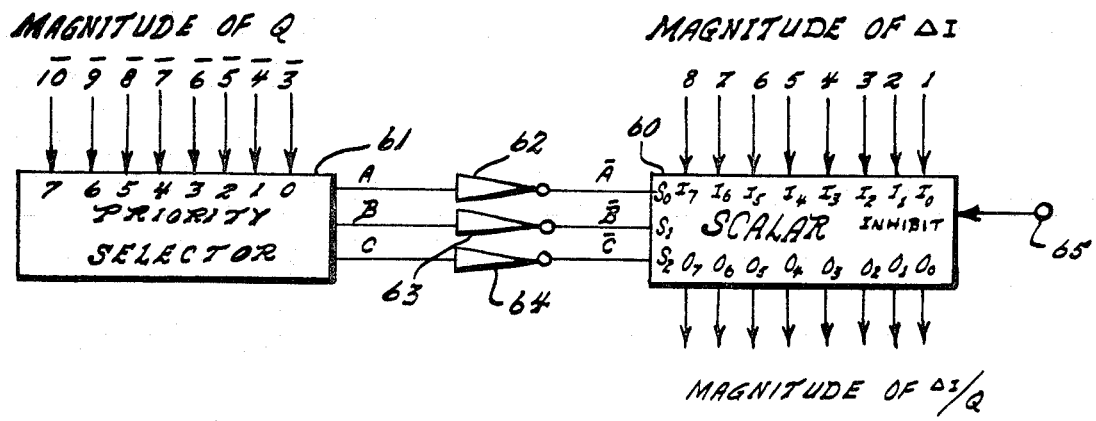

FIG. 4

| Position of Most Significant "One" in Q | Priority Selector Output | | | Scalar Output ($\Delta I$) | | | | | | | |
|---|---|---|---|---|---|---|---|---|---|---|---|
| | C | B | A | $O_7$ | $O_6$ | $O_5$ | $O_4$ | $O_3$ | $O_2$ | $O_1$ | $O_0$ |
| 0 | 1 | 1 | 1 | $\bar{8}$ | $\bar{7}$ | $\bar{6}$ | $\bar{5}$ | $\bar{4}$ | $\bar{3}$ | $\bar{2}$ | $\bar{1}$ |
| 1 | 1 | 1 | 1 | $\bar{8}$ | $\bar{7}$ | $\bar{6}$ | $\bar{5}$ | $\bar{4}$ | $\bar{3}$ | $\bar{2}$ | $\bar{1}$ |
| 2 | 1 | 1 | 1 | $\bar{8}$ | $\bar{7}$ | $\bar{6}$ | $\bar{5}$ | $\bar{4}$ | $\bar{3}$ | $\bar{2}$ | $\bar{1}$ |
| 3 | 1 | 1 | 1 | $\bar{8}$ | $\bar{7}$ | $\bar{6}$ | $\bar{5}$ | $\bar{4}$ | $\bar{3}$ | $\bar{2}$ | $\bar{1}$ |
| 4 | 1 | 1 | 0 | | $\bar{8}$ | $\bar{7}$ | $\bar{6}$ | $\bar{5}$ | $\bar{4}$ | $\bar{3}$ | $\bar{2}$ |
| 5 | 1 | 0 | 1 | | | $\bar{8}$ | $\bar{7}$ | $\bar{6}$ | $\bar{5}$ | $\bar{4}$ | $\bar{3}$ |
| 6 | 1 | 0 | 0 | | | | $\bar{8}$ | $\bar{7}$ | $\bar{6}$ | $\bar{5}$ | $\bar{4}$ |
| 7 | 0 | 1 | 1 | | | | | $\bar{8}$ | $\bar{7}$ | $\bar{6}$ | $\bar{5}$ |
| 8 | 0 | 1 | 0 | | | | | | $\bar{8}$ | $\bar{7}$ | $\bar{6}$ |
| 9 | 0 | 0 | 1 | | | | | | | $\bar{8}$ | $\bar{7}$ |
| 10 | 0 | 0 | 0 | | | | | | | | $\bar{8}$ |

FIG. 5

INVENTOR.
JOHN W. TAYLOR JR.
BY Harry A. Herbert Jr
George Fine and
ATTORNEYS

DIGITAL MOTION COMPENSATION SYSTEM FOR RADAR PLATFORMS

BACKGROUND OF THE INVENTION

This invention relates to radar platforms and more particularly a digital motion compensation system for a radar platform. This invention encompasses digital MTI devices used by radars to distinguish moving targets from stationary echoes. It describes a means of detecting motion of the radar platform by a digital process, using data which has already been digitized and stored for MTI purposes. The amount of additional digital hardware is minimal so that the cost is comparable with present analog techniques but the performance is far superior.

Prior techniques, in addition to having the inherent accuracy or stability problems of analog devices, have been based on measurement of the doppler frequency received from the clutter. A filter is utilized to add vectorially all the clutter received from each transmission of the radar into a single sample, and the phase change from one sample to the next is the doppler frequency indicated by a frequency discriminator. With a scanning antenna, attempts to compensate for this measure platform motion have been limited in performance by scan modulation, interference from other active sources, and lag error in the servo. These three sources of error will be considered before the disclosed technique is explained.

The scanning of the antenna modulates the clutter, producing a spectral width which prevents precise determination of doppler frequency. Since this doppler spread also prevents clutter cancellation, one would hope to determine velocity to a reasonable fraction of antenna tip speed.

A dominant point source will often overpower the other scatterers in a range cell, and the antenna modulation of such a source will produce predominantly amplitude modulation. A frequency discriminator which disregards amplitude modulation will not be disturbed by this type of clutter spectrum.

Unfortunately, in distributed clutter the vector summation of many amplitude-modulated scatterers produces just as much phase-modulation. Consequently, a frequency discriminator which disregards amplitude modulation will offer only modest advantage.

The most important characteristic of the clutter spectrum is that it should be identical in all range cells (unless the clutter is different). The spectrum is produced by the motion of the various portions of the antenna surface, not by the clutter itself. Consequently, coherent addition of a number of range cells does not produce a better measure of velocity. This is a characteristic deficiency of all prior systems of motion compensation. On the other hand, if separate measures of velocity are made in a number of range cells, their average can give an improved measure of velocity.

An analogy is the measurement of noise level. A filter prior to detection does nothing to reduce the amplitude deviation of a single noise sample from its rms value. The rms level can be estimated to greater precision from a number of samples, however, provided that they are separated in time by more than the inverse of the receiver bandwidth.

In addition to the echoes from stationary clutter, extraneous echoes may interfere with the velocity determination. These may consist of moving targets, but such disturbance is unlikely to be comparable with clutter in magnitude. Strong interference signals from other radars are a more serious threat. This is a characteristic deficiency of all prior systems of motion compensation.

If separate velocity determination is made for each range cell, and the average value extracted, the strong interference in one range cell does not produce undue distortion in the answer. The action is somewhat analogous to a Dicke-fix receiver, which ignores signal strength and separates desired information from interference on the basis of its consistency.

Although the radar platform may have little acceleration, the clutter velocity varies sinusoidally due to the scanning antenna. Any delay in extracting a measure of the velocity limits the speed of reaction of the servo correction to an order of magnitude longer time; the servo corrects for past velocity, not present velocity.

The accuracy of velocity data can be improved by two processes. A single range sample of clutter may be processed over a longer and longer time. Until one reaches the duration of the data (the dwell time of the radar), a steady increase in measurement accuracy results, but time delay becomes serious. This is a characteristic deficiency of all prior systems of motion compensation. Alternatively, velocity can be measured from as few as two range sweeps. The data from individual range samples is crude, but the average can be reasonably accurate. The use of multiple range samples improves velocity accuracy without compromising time delay.

SUMMARY OF THE INVENTION

A digital motion compensation system for radar platforms in which data normally collected for MTI cancellation provides for velocity compensation. The system requires supplemental data in the form of a Q detector (in addition to the I detector for MTI). A number of decision elements for determining whether data should be accepted from a particular range cell are provided.

Ideally, one would measure velocity from the phase change ($\Delta \theta$) between pulses. However, the availability of $\Delta$ I data in the MTI system, stored for all range cells, makes the use of this form of data desirable. The basic idea is to select only those range cells whose signals are sufficiently strong to represent clutter, and whose phase is such that $\Delta$ I and Q data can give a crude approximation to $\Delta \theta$ information. Although the individual measurements of velocity error are crude, the average of 32 can be quite accurate.

If the amplitude and phase of an echo are defined as A and $\theta$, $I = A \cos \theta$ and $Q = A \sin \theta$.

Reject data if:

1. $|I| > |Q|$. This eliminates the area of the phase detector which is more sensitive to amplitude modulation than phase modulation and phase modulation produces nonlinear output.

2. $|Q| <$ Threshold. This eliminates noise or weak clutter areas.

3. Outside of restricted range segment. This eliminates those close-in clutter areas giving a false measure of motion. For a ship, this would be sea clutter; for a helicopter, clutter seen at high depression angle.

Extract velocity error of acceptable data:

(1) $$\frac{\Delta I}{Q} \simeq \frac{A\Delta\theta}{A} = \Delta\theta \text{ when } |I| < |Q|$$

2. Further approximate by limiting division to powers of 2. If Q is acceptable only between 20 db and 44 db above noise, only four different decisions on Q amplitude plus sign are necessary.

3. Limit number of data samples to 32 to fix maximum gain of servo loop. Sum the velocity errors of the first 32 acceptable data samples received after each transmission and use this as an error signal to correct the frequency of a voltage-controlled oscillator.

Note that the compensation system of the invention affects only the IF section of the receiver. The local oscillator frequency is undisturbed.

An object of the present invention is to provide a digital motion compensation system for radar platforms using data already digitized and stored for moving target indicator purposes.

Another object of the present invention is to provide a digital motion compensation system for radar platforms including means for detecting motion of the radar platform by a digital process.

These and other advantages, features and objects of the invention will become more apparent from the following description taken in connection with the illustrative embodiment in the accompanying drawings wherein:

FIG. 4 illustrates in block diagram form one version of divider 29 of FIG. 1; and FIG. 5 illustrates the table associated with the apparatus illustrated in FIG. 4.

DETAILED DESCRIPTION OF THE PREFERRED EMBODIMENT

Figure 1:
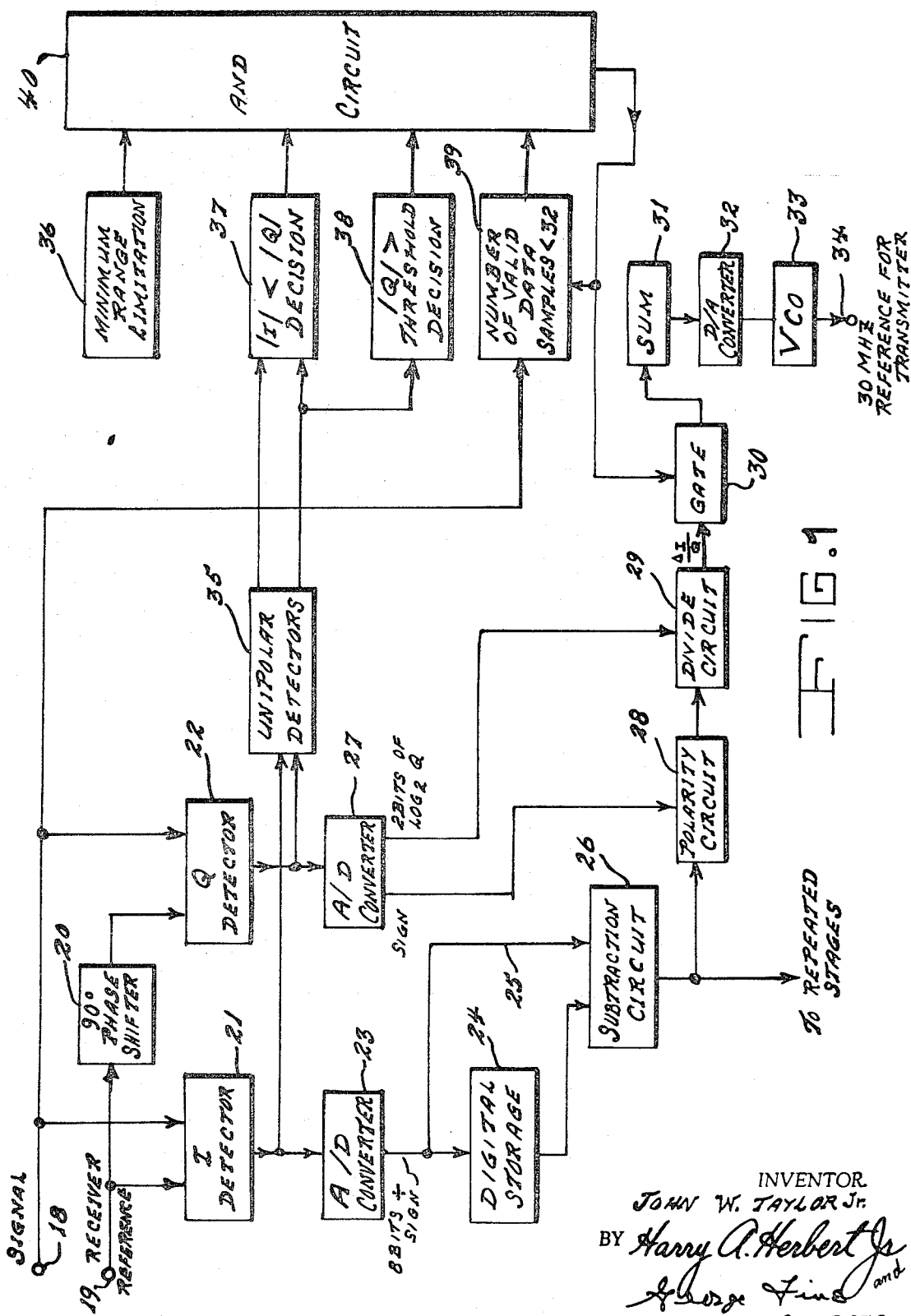
FIG. 1 illustrates in block diagram form a preferred embodiment of the invention.

Now referring in detail to FIG. 1, there are two input signals, one being received at terminal 18 are the radar echoes at an intermediate frequency (typically 30 MHz) and the second a CW (continuous wave) receiver reference signal at the same frequency. The latter is generally referred to as the COHO, or coherent oscillator signal of an MTI radar. It is split into two components differing in phase by 90° by passing it through 90° phase shifter 20. They serve as the phase reference for the two I and Q synchronous detectors 21 and 22, respectively.

I detector 21 receives as inputs radar echo signal from input terminal 18 and the receiver reference signal from input terminal 19. The output of I detector 21 is converted to a digital number by analog to digital (A/D) converter 23. A/D converter 23, digital storage 24, and subtraction circuit 26 provide a stage of a digital MTI filter which rejects stationary echoes. It is noted line 25 provides the second input to subtraction circuit 26. Repeated stages may be provided, as required, for increased rejection of slowly moving echoes in the typical radar.

A detector 22 receives an input signal from terminal 18 and another from 90° phase shifter 20. The output of Q detector 22 is also converted to a digital word (but is not necessarily stored for MTI purposes) by A/D converter 27. The output of A/D converter 27 is assumed to consist of a polarity bit and a magnitude, typically represented by six or more bits. The output of MTI subtraction circuit 26 is assumed to be in similar form; it is called Δ I.

Figures 2, 3:
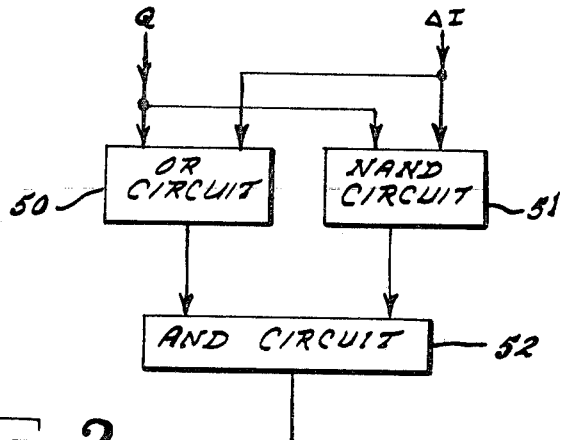
FIG. 2 illustrates in block diagram form one form of polarity component 28 of FIG. 1.
FIG. 3 illustrates the truth table for the apparatus illustrated in FIG. 2.

The next step is the digital computation of ΔI/Q in two steps. Conventional polarity circuit 28 receives an input from A/D converter 27 and one from subtraction circuit 26 and produces a positive output wherever its two inputs are identical (both positive or both negative). It may be constructed from a variety of standard digital logic elements, but one form is shown in FIG. 2 wherein OR circuit 50 receives a Q input signal and a Δ I input signal and NAND circuit 51 receives a Q input signal and a Δ I input signal. The input polarity bits are 0 = +; 1 = 0. The output signals from OR circuit 50 and NAND circuit 51 are received by AND circuit 52 which then provides the output polarity bit. FIG. 3 illustrates the Truth Table associated with the apparatus of FIG. 2.

Now referring again to FIG. 1, the magnitude of the ΔI/Q ratio is determined by divide circuit 29. A standard digital divider can be employed, although its accuracy is unnecessary and variety of simpler integrated circuit modules can be utilized. For example, the division can be limited to scaling Δ I by powers of 2 (shifting to the right) as performed by the apparatus shown in FIG. 4. Scalar 60 (such as Signetics 8243) performs this function. It is controlled by priority selector 61 (such as Fairchild 9318) which determines the position of the most significant "one" in the Q magnitude. Priority selector 61 is interconnected to Scalar 60 by inverters 62, 63, and 64.

Priority selector 61 need not utilize the two (or even three) least significant bits of Q, because the other decision logic will reject signals this weak. Consequently, the element can accommodate digital numbers up to 12 bits (including polarity). This particular unit operates with inverted logic (0 = 1 and 1 = 0), indicated by bars over the bit identification numerals. Similarly, its output must be inverted for proper control of the particular scalar. Neither of these conditions are necessary parts of the operation; they represent constraints of these particular components.

The scalar produces a duplicate of the input digital word but shifted to the right by an amount dictated by the three control lines C, B, and A. It can accommodate Δ I values up to nine bits (including polarity). If the MTI provides more bits than this, the data can be rejected whenever a "one" appears in the ninth or higher bits. This is a hardware constraint which may, when necessary, be added to those conditions for rejecting data.

Scalar 60 also performs the gating function as shown by gate 30 of FIG. 1; its output is inhibited when a 1 is applied to inhibit terminal 65 from AND circuit 40 of FIG. 1. This 1 from AND circuit 40 is provided upon the coincidence of signal inputs from minimum range limitation circuit 36, |I| < |Q| decision circuit 37, |Q| > threshold circuit 38, and number of valid data samples < 32 circuit 39 of FIG. 1. This rejection of a particular range segment of data, as being unsuitable, occurs when:

1. |I| > |Q|. This eliminates the area of the phase detector which is more sensitive to amplitude modulation than phase modulation and phase modulation produces nonlinear output. In analog form, this is accomplished by a pair of conventional unipolar detectors (which convert negative voltages to positive with equivalent magnitude) and a voltage comparator. The equivalent operations may also be done digitally. This function is accomplished as shown in FIG. 1 by unipolar detectors 35 and |I| < |Q| decision circuit 37 (a voltage comparator).

2. |Q| < threshold. This eliminates noise or weak clutter areas. This is another voltage or digital comparator. This function is performed as illustrated in FIG. 1 by |Q| > threshold decision circuit 38.

3. Outside of restricted range segment. This eliminates those close-in clutter areas giving a false measure of motion. For a ship, this would be sea clutter; for a helicopter, clutter seen at high depression angle. This is accomplished by the radar synchronizer associated with the MTI radar, which produces a range gate (by digital or analog processes) at the time when data may be accepted. This function is accomplished by minimum range limitation circuit 36 of FIG. 1.

4. Thirty-two acceptable echo samples have been accumulated from the latest transmission. This is sensed by a 6-bit digital counter, counting "valid data" pulses at the output of the AND gate of FIG. 1. When the counter's MSB reaches "one", its input to the "AND" gate is changed to "Zero". This function is performed by a number of valid data samples < 32 circuit 39 of FIG. 1.

The 32 samples are added by a standard digital accumulator such as sum circuit 31 of FIG. 1. When the above signal is generated, indicating that data collection is ended, the sum is transferred to a standard digital-to-analog converter 32. The DC voltage at this point is proportional to the error in transmitter frequency, which must be changed to compensate for motion of the radar platform. Voltage controlled oscillator (VCO) 32 acts as the COHO for generating the transmitter frequency. Note that in order to compensate for platform motion there must be two COHO's on slightly different frequencies, one for transmit and another for receive. It is preferable to compensate the transmitter frequency rather than the receiver.

The voltage controlled oscillator does not respond instantly to the latest error measurement. It is part of a servo loop, with a bandwidth a few percent of the radar pulse repetition frequency. The DC voltage is the standard error input to such a servo system.

Note that the proposed compensation system affects only the IF section of the receiver; the local oscillator frequency is undisturbed. The disadvantages associated with IF compensation are: (1) a different VCO is required for each frequency which the radar wishes to rapidly switch between, because the doppler correction varies with frequency, and (2) the carrier phase is corrected but the modulation is left uncorrected.

The latter effect causes a spurious output in phase detectors, where limiting has caused the modulation spectrum to have poor skirt characteristics. If the range resolution were ½ μs, the cancellation would be limited to about 40 db due to this spurious; but each doubling of the pulse width decreases the spurious by 12 db, so this is insignificant for pulses exceeding about 2 μs.

The phase detector spurious can be avoided by compensating the phase of the transmitter, and making the PRF a subharmonic of 30 MHz. The block diagram indicates such an approach. However, spurious components can now be created in the modulation of the transmitter if care is not exercised.

The spurious products become serious only when there are a small number of cycles of carrier at the point where modulation is applied or removed. Consequently, gating the transmitter or coding it at RF produces negligible spurious, while similar processes at 30 MHz may produce trouble.

Clearly there are many applications in which the disadvantages of compensation at IF outweigh its simplicity. In such cases, compensation at RF would be employed but the basic intent is the same, to create a clutter signal at the phase detector whose phase is unchanging, even though the radar platform is in motion.

The disclosure has emphasized the use of the digital data stored by digital MTI systems to compensate for the motion of the radar platform. This is the primary function of the system, but several auxiliary tasks may be performed such as detection of motion for navigational purposes. The frequency differential between the VCO and the local reference frequency employed in the phase detectors gives a measure of what one might call "apparent velocity" in the direction the radar beam is pointed. By mutliplying this by the sine and cosine of the antenna pointing angle (or step approximations to these functions) and averaging over a complete scan of the antenna, the forward and sidewise motion may be accurately determined. This could be a valuable source of information for a ship within range of land.

The motion of an airborne radar is accurately measured only by clutter at long range (low depression angles). However, clutter at shorter ranges can be employed if the "clutter velocity" measured at any particular range R is multiplied by $$1 + \tfrac{1}{2}(h/R)^2$$

to compensate for the depression angle. The "clutter velocity" in this case is a combination of "apparent velocity" of the VCO and the velocity error measured by the digital motion detector at that range.

Another task which may be performed is suppression of moving clutter. Where chaff is encountered, its localized area can be designated by the PPI operator, and control within this area, switched to a second VCO. This will retain optimum cancellation of ground clutter in all other areas of the display and permit the best compromise within the chaff area.

Still another task which may be performed is suppression of ground clutter at high depression angle. Where an airborne radar desires to detect targets at ranges not many times its altitude, suppression of clutter received at moderate depression angles is necessary. A multiplicity of VCO's may be employed, each assigned to a specific doughnut area representing an acceptable spread of clutter velocities.

As an example, assume a helicopter at one mile altitude, travelling at 50 knots. If motion compensation to ± 1 percent (one-half knot) is desired, clutter may be accepted from a range of five times its altitude to maximum range. If low altitude targets at ranges closer than 5 miles are not to be obscured by clutter, a second VCO can reduce the minimum range to 3.5 times the height. A third VCO would reduce the minimum range to about three times the height, but the law of diminishing returns has set in. It is possible that a single VCO can accomplish the same task, switching between a multiplicity of error storage devices, if switching transients effects can be made sufficiently small.

A system has been described which utilizes data which has been digitized and stored for MTI purposes, to detect error in motion compensation. Its performance is far superior to prior analog systems, because it provides 32 (or more) independent range samples of clutter. The individual samples are subject to a degree of uncertainty because of the modulation produced by the scanning antenna, but by averaging 32 samples, much more precise velocity determination is possible. The servo can provide fast response to an indicated error in velocity and lag error becomes insignificant.

Simple logical processes have been disclosed which minimize the cost of implementation of the concept yet provide adequate data accuracy. Extensions of the concept to provide auxiliary functions have been briefly mentioned.

The technique is of utmost importance to those radars whose scanning antennas produce a velocity spectrum from clutter which nearly fills the clutter notch of the MTI velocity response; little room for error in motion compensation is available. In addition, by providing greater accuracy when scanning continuous clutter, the technique provides faster response when the beam scans from open sea onto an island or land mass.

It is noted in the concept of this invention there may be employed any predetermined number of valid echo samples; 32 is merely a typical value used for purposes of illustration. The predetermined number of samples is usually chosen to be less than 25 percent of the number of range cells covering the usual clutter region; this maintains a high probability that the expected number of valid samples will be accepted from each transmission.

What is claimed is:

1. A digital motion compensation system for providing error correction signals for radar platforms comprising an I detector receiving a reference signal and radar echo signals, a phase shifter shifting said reference signal 90°, a Q detector receiving said radar echo signals and said 90° phase shifted reference signal, a digital MTI filter receiving the output from said I detector, an analog to digital converter receiving an output signal from said Q detector, a polarity circuit simultaneously receiving signals from said digital MTI filter and said analog to digital converter, said polarity circuit producing a positive output whenever its two inputs are identical, a divide circuit receiving simultaneously signals from said polarity circuit and said analog to digital converter, a pair of unipolar detectors, one receiving a signal from said I detector and the other a signal from said Q detector, an AND circuit, means to determine whether the I signal from said pair of unipolar detectors is greater than the Q signal, the output therefrom being a first signal to said AND circuit, means to determine whether the Q signal is less than a preselected threshold signal, the output therefrom being a second signal to said AND circuit, means to accumulate a preselected number of echo signals to thereupon provide an actuating output signal being a third signal to said AND circuit, means to provide a signal representative of a preselected minimum radar range being a fourth signal to said AND circuit, said AND circuit upon receipt of said first, second, third, and fourth signals providing an output signal; a gate circuit receiving the output signals from said divide circuit and said AND circuit, summing means receiving the output from said gate circuit, a digital to analog converter receiving the output from said gate circuit, and a voltage controlled oscillator receiving a signal from said digital to analog converter to provide said error correction signals.

2. A digital motion compensation system as described in claim 1 wherein said digital MTI filter is comprised of an analog to digital converter receiving the output of said I detector, digital storage means receiving the output of said analog to digital converter, a subtraction circuit receiving simultaneously the output signals from said analog to digital converter and said digital storage means.

3. A digital motion compensation system as described in claim 1 wherein said polarity circuit is comprised of an OR circuit and a NAND circuit, each circuit receiving an identical pair of signals, namely the output signal from said digital MTI filter and the output signal from said analog to digital converter, and an AND circuit receiving the outputs from said OR circuit and said NAND circuit.

* * * * *